United States Patent
Howse

(10) Patent No.: US 6,327,810 B1
(45) Date of Patent: Dec. 11, 2001

(54) PEST TRAP

(75) Inventor: Philip Edwin Howse, Gosport (GB)

(73) Assignee: University of Southhampton (GB)

( * ) Notice: Subject to any disclaimer, the term of this patent is extended or adjusted under 35 U.S.C. 154(b) by 0 days.

(21) Appl. No.: 09/068,985
(22) PCT Filed: Nov. 22, 1996
(86) PCT No.: PCT/GB96/02893
  § 371 Date: Dec. 2, 1998
  § 102(e) Date: Dec. 2, 1998
(87) PCT Pub. No.: WO97/18704
  PCT Pub. Date: May 29, 1997

(30) Foreign Application Priority Data

Nov. 23, 1995 (GB) .................................. 9523995

(51) Int. Cl.⁷ .............................. A01M 1/14; A01M 1/10
(52) U.S. Cl. .................................. 43/114; 43/121; 43/107
(58) Field of Search .......................... 43/107, 113, 114, 43/121, 122, 132.1

(56) References Cited

U.S. PATENT DOCUMENTS

| 272,372 | * | 2/1883 | Banks | 43/121 |
|---|---|---|---|---|
| 2,255,360 | * | 9/1941 | Miller | 43/121 |
| 3,851,417 | * | 12/1974 | Wunsche | 43/121 |
| 4,030,233 | * | 6/1977 | Wunsche | 43/121 |
| 4,263,740 | * | 4/1981 | Hemsarth et al. | 43/114 |
| 4,364,194 | * | 12/1982 | Clark, Sr. | 43/131 |
| 4,423,564 | * | 1/1984 | Davies et al. | 43/121 |
| 4,505,065 | * | 3/1985 | Niemeyer | 43/107 |
| 4,519,160 | * | 5/1985 | McBrayer | 43/113 |
| 4,608,774 | * | 9/1986 | Sherman | 43/114 |
| 4,654,998 | * | 4/1987 | Clay | 43/113 |
| 4,788,789 | * | 12/1988 | Boobar et al. | 43/113 |
| 4,819,370 | * | 4/1989 | Woodruff | 43/113 |
| 5,172,514 | * | 12/1992 | Weber et al. | 43/132.1 |
| 5,513,465 | * | 5/1996 | Demarest et al. | 43/113 |
| 5,771,628 | * | 6/1998 | Nobbs | 43/121 |
| 6,108,965 | * | 8/2000 | Burrows et al. | 43/113 |

FOREIGN PATENT DOCUMENTS

| 2171882 | * | 9/1986 | (GB) | 43/113 |
|---|---|---|---|---|
| 2275409 | * | 8/1994 | (GB) | 43/113 |
| WO 92/20224 | * | 11/1992 | (WO) | |
| WO 93/22909 | * | 11/1993 | (WO) | |
| WO 94/00980 | * | 1/1994 | (WO) | |
| WO 94/18827 | * | 9/1994 | (WO) | |

* cited by examiner

Primary Examiner—Darren W. Ark
(74) Attorney, Agent, or Firm—Bacon & Thomas PLLC

(57) ABSTRACT

A pest trap which comprises retaining means (9) and one or more members (3) having substantially smooth surfaces mounted above the retaining means, whereby a pest displaced from the smooth surface falls into the retaining means (9). The members with smooth surfaces may comprise rods or spheres which may optionally be coated with electrostatically charged powder.

11 Claims, 2 Drawing Sheets

PEST TRAP

BACKGROUND OF THE INVENTION

This invention relates to a pest trap.

A number of different types of pest trap are commonly in use. These include no-exit traps, traps with sticky retaining surfaces, traps with a knock-down insecticide and traps which electrocute, killing instantaneously.

Examples of the different types of trap include the Victorian trap, a no-exit trap which comprises a glass bowl with a central entrance beneath. The entrance projects up into the dome of the bowl and flies enter from below, then continue to fly upwards or outwards towards a source of light, thereby preventing their escape back out through the entrance. These are bulky, difficult to empty and clean and not very efficient because insects tend not to enter cavities without inducement.

Simple fly-paper provides a sticky trap, which is hung vertically and which retains flies on adhesive on its surface when they land. Insecticide traps are similar, being constructed from a material which retains insecticide that is absorbed on contact by the insects when they land on the surface of the trap. However, sticky paper covered with flies is unsightly and difficult to handle.

Another type of trap is described in International patent publication number WO94/00980. Insects land on a powder coated surface of a funnel on which they are unable to grip with their feet and so they slide down the funnel into a retaining box or sticky surface.

Electrical traps generally have a light source to attract the insects. The insects land on a metal grid charged to a high voltage and are electrocuted when they bridge the gap between this and an earthed surface. Use of a large grid at high voltage and the particulate debris of disintegrating insects which is shed into the air are undesirable and can be a health hazard, for example when used in food preparation areas. In addition, the powerful light source illuminating the grid area and used as an attractant emits in the ultraviolet which can be damaging to vision.

BRIEF SUMMARY OF THE INVENTION

In accordance with the present invention, a pest trap comprises retaining means; and one or more members having substantially smooth surfaces; wherein the or each member is mounted above the retaining means such that a pest displaced from the smooth surface falls into the retaining means.

The present invention has advantages over prior art traps in that it is a simple device which does not require a high voltage power supply and it exploits the natural inclination of pests to crawl over surfaces by providing a smooth member above retaining means with spaces so that insects land on the trap and slide off the smooth member into the retaining means, which can easily be emptied.

Preferably, the retaining means comprises opaque material. This is preferable for the user who does not see the accumulated trapped pests.

Preferably, the or each member is coated with electrostatically charged powder. This powder stops the pest from gripping, increasing the likelihood that the pest will fall into the retaining means.

Typically, the or each member comprises glass or plastics material.

At least one of the retaining means and the or each member may be provided with an attractant or toxic substance.

Preferably, the attractant is chosen from one of colour, food, food derived attractants or pheromones e.g. for houseflies, (Z)-9-tricosene pheromone.

Preferably, the toxic substance is a biologically active material.

The retaining means may further comprise a lining to which trapped pests adhere, such as an adhesive coating.

Alternatively, the trap further comprises an exit to permit pests to escape after being exposed to the toxic substance. By letting pests escape after exposure, they can carry the toxic substance away and pass it on to other pests.

Preferably, the or each member is at least part spherical in cross-section.

Preferably, the trap comprises a plurality of members, spaced from one another.

These members are generally all the same shape in one trap, e.g. they could be spherical, tubular, diamond shaped or polyhedral.

The members may be arranged in a single row, but preferably, the members are arranged in two or more rows, displaced form one another. In this way the pests fall down through the gaps, but it is made more difficult for them to escape again.

BRIEF DESCRIPTION OF THE INVENTION

Examples of pest traps in accordance with the present invention will now be described with reference to the accompanying drawings in which.

DETAILED DESCRIPTION OF THE DRAWINGS

Figure 1:
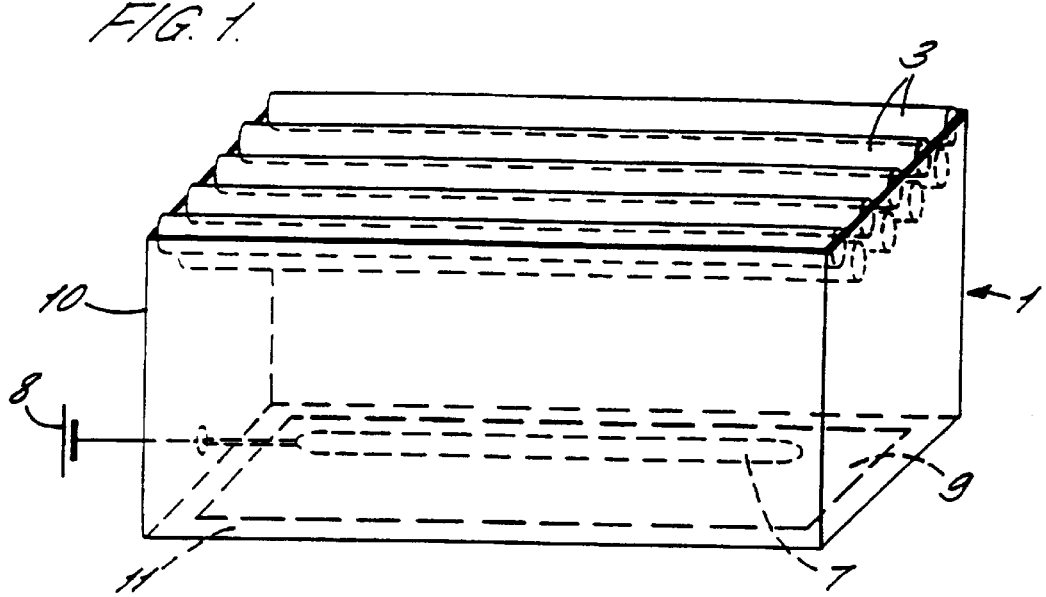
FIG. 1 is a perspective view of a trap according to the present invention.
Figure 2:
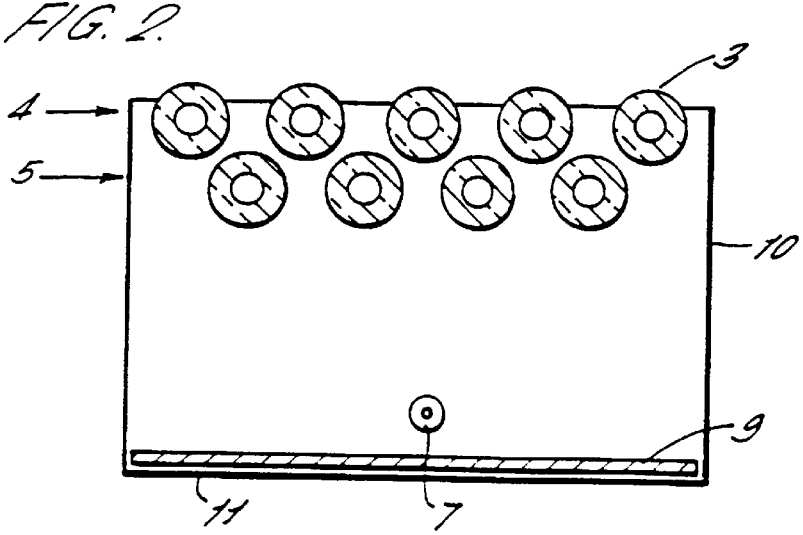
FIG. 2 is a cross section through the trap of FIG. 1.

FIG. 1 illustrates an example of a pest trap according to the invention. A rectangular container 1 having walls 10 and a base 11 made of plastic or glass, supports at the upper surface of the walls 10 several cylindrical rods 3. Each rod is substantially identical and made of transparent or semi-transparent plastics or glass. The rods 3 may be hollow or solid and are mounted, movably or fixedly, to the container 1 in two offset rows 4,5 spaced from one another. In addition, an attractant in the form of a light source 7 powered by a battery 8 or mains supply is provided within the container and a sticky surface 9 on the base.

Figure 3:
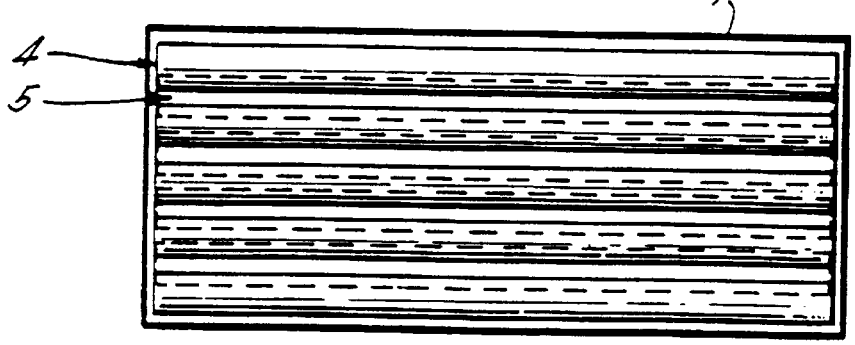
FIG. 3 is a view from above of the trap of FIG. 1.

As can be seen in FIG. 3, the appearance to an insect of the upper surface of the container 1 is of a continuous surface and the insect is encouraged to land and crawl over the rods 3 by the presence of a light source inside the container. Alternative ways to attract insects include using chemical stimuli such as pheromones, food, food derived additives, colour or visual markings, the colour or markings being applicable to the container 1 and/or the rods 3. Using any of these attractants would be effective even if the container and rods where made of opaque materials including polished metals or treated cardboard, which provides an insulating substrate.

The rods 3 and interior of the container 1 are coated with material which render their surfaces slippery to the insect, for example, electrostatically charged powders, Teflon™, or PTFE.

Figure 4:
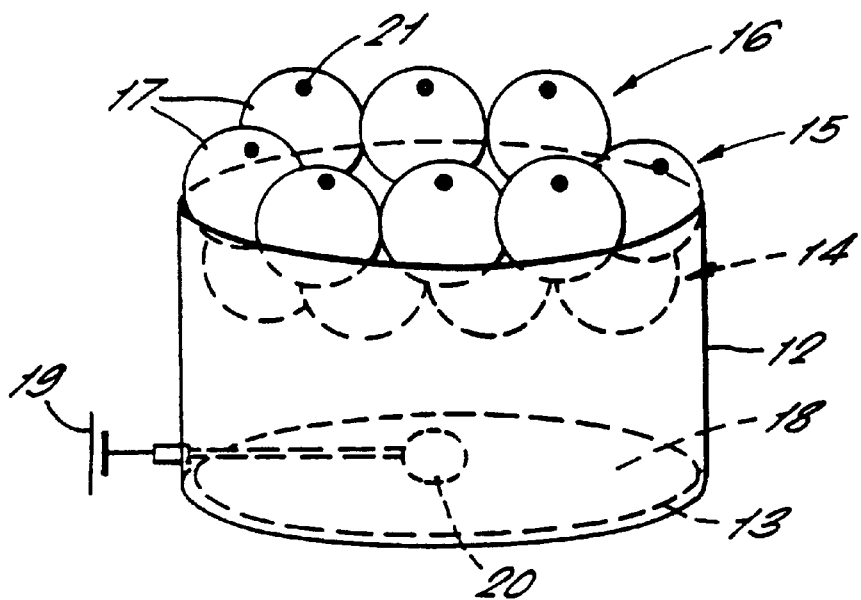
FIG. 4 is a perspective view of an alternative arrangement for a pest trap according to the invention; and, FIG. 5 is a perspective view of another example of a trap according to the invention.

Another example is shown in FIG. 4. In this case the container has a cylindrical wall 12 and a circular base 13. Mounted at the top of the wall 12 are multiple layers 14,15,16 of spheres 17 made of transparent glass or plastics. At the base of the container is a layer of glue 18 for retaining insects which fall onto it and a light source 20 powered by a battery 19 or main supply to attract the insects. The light is visible through the transparent spheres.

The surfaces of the spheres form openings through which insects of an appropriate size will fall. The spheres in each layer are juxtaposed and arranged such that gaps in one layer 15 are offset from gaps in adjacent layers 14,15. The spheres have smooth surfaces and are coated with a slippery material as described above. Small black markings 21 on the surface of the spheres and attractants, such as feeding attractant (sugar or proteins) or pheromones (e.g. (Z)-9-tricosene for houseflies), encourage insects to land. They are then entrapped by the glue layer 18.

The multiple layer arrangement 14,15,16 provides a physical barrier making escape difficult. This physical barrier is enhanced by coating the wall 12 of the container with slippery material as described above.

Variants of the traps described above are feasible. For example the shape of the members may be hemispheres, diamonds or polyhedra in place of the spheres; rods having triangular or other polyfaceted cross-sections; and in curved, circular or spiral form. Insects may be retained within the container in various ways other than using adhesive as described above, such as by lining the inside of the container with a chemical or biological insecticide, a layer of powder, a fluid or desiccant.

Figure 5:
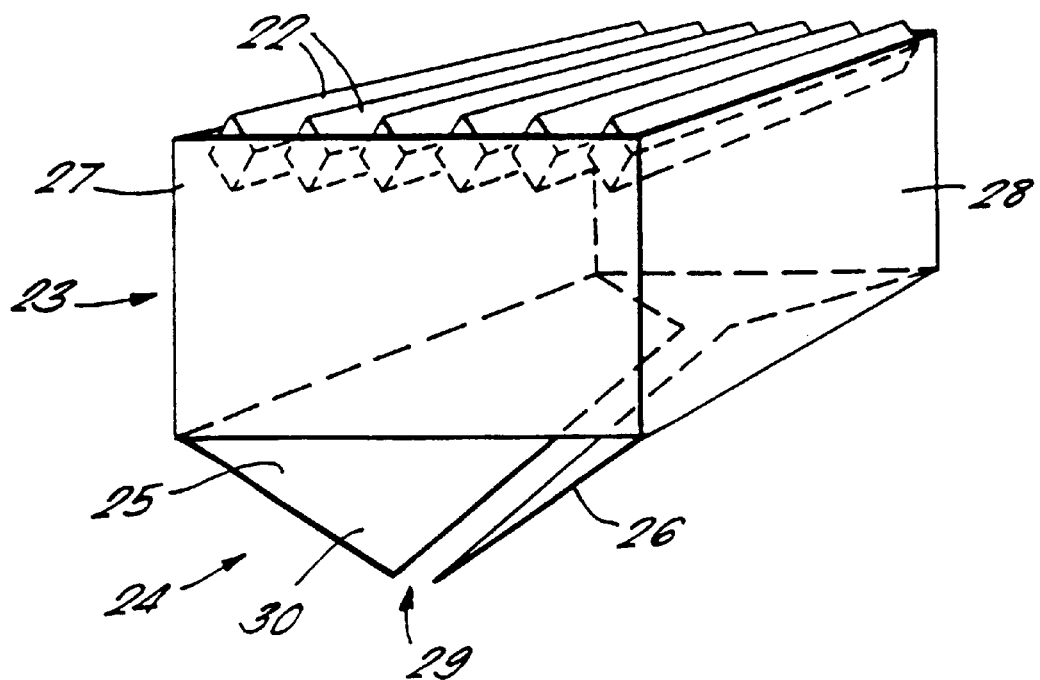

In other cases as shown and described with respect to FIG. 5, it may be preferred that the insects are allowed to escape again after coming into contact with a biologically active chemical which they can spread amongst the insect population. In this example, a number of diamond cross section rods 22 are arrayed, spaced from one another, above a container 23. A base 24 of the container comprises flaps 25,26 which are inclined with respect to sides 27,28 of the container. These flaps are arranged such that there is a space between them at the bottom of the container and optionally at either end forming an exit 29. Each of the flaps 25,26 is coated with a biologically active material 30 which attaches itself to the insects as they fall through between the rods and crawl to the exit, so that the insects can carry this on their bodies and spread it to other insects.

Sometimes insects are trapped to be used for research purposes, so no toxic products would be included in the container and the flaps would only be opened when the insects are being transferred to another storage container.

Experimental data has been obtained for a trap of the type shown in FIG. 4 by releasing 100 houseflies (*Musca domestica*) into a standard housefly testing room of approximately 30 m$^3$ maintained at a temperature of 25° C.±2° C. A trap was placed in the centre of the room. The trap was coloured yellow and black spots were placed in the centre of each of the upper spheres to provide visual attraction. The spheres were also coated with (Z)-9-tricosene to attract flies by odour. The number of flies caught in a 24 hour period using contact lighting was monitored and are as shown in the table below. This can be compared with the results for a conventional trap. Parallel tests were done in an empty office of similar size and then a further set of tests in an empty office for 13 hours light followed by 11 hours light.

It can be seen from the results in the test room that at the end of 24 hours all the flies had been trapped using the trap of the present invention. In the empty office using 13 hours lighting, 98% had been trapped and in the example of an office using 24 hours lighting 80% were caught in the trap. By comparison from the results for a conventional insecticide impregnated cardboard trap in a standard fly room it can be seen that only 45% of the flies present are trapped.

TABLE

No. of houseflies trapped in a trap with spheres over a 24 hour period

| Hours after start | Test room 24 h light | Empty office (24 h light) | Empty office (13 h light) | Conventional Trap |
| --- | --- | --- | --- | --- |
| 1 | 10 | 15 | 21 | 2 |
| 2 | 12 | 32 | 43 | 5 |
| 3 | 25 | 57 | 56 | 10 |
| 4 | 38 |  | 66 | 13 |
| 5 | 48 | 87 | 73 | 23 |
| 6 | 55 |  | 79 | 25 |
| 7 | 67 |  | 75 | 29 |
| 8 | 76 |  | 78 | 29 |
| 24 | 100 | 80 | 98 | 45 |

What is claimed is:

1. A pest trap comprising:

a retaining means comprising a hollow receptacle having an open interior area defined by walls, a bottom and an open top area directly above the interior of the receptacle, said bottom having a lining to which pests adhere;

a plurality of spaced apart members having smooth surfaces extending in at least two substantially horizontal layers which both span the open top area and are spaced a distance from the bottom of the receptacle;

wherein members in one horizontally extending layer are positioned offset from members in another adjacent horizontally extending layer such that a pest displaced from the smooth surface of one of the members falls into the interior of the receptacle.

2. The pest trap as claimed in claim 1 wherein the members are spheres or hemispheres.

3. The pest trap as claimed in claim 1 wherein the retaining means comprises opaque material.

4. The pest trap as claimed in claim 1 wherein the members are coated with electrostatically charged powder.

5. The pest trap as claimed in claim 1 wherein the members comprise glass or plastics material.

6. The pest trap as claimed in claim 1 wherein at least one of the retaining means and the members is provided with an attractant or toxic substance.

7. The pest trap as claimed in claim 6, wherein the attractant is chosen from one or more of color, food, food derived attractants or pheromones.

8. The pest trap as claimed in claim 6, wherein the toxic substance comprises a biologically active material.

9. The pest trap as claimed in claim 1, wherein the members are rods.

10. The pest trap as claimed in claim 9, wherein the rods have polyfaceted cross sections.

11. The pest trap as claimed in claim 9, wherein the rods are tubular.

* * * * *